(12) United States Patent
Kim et al.

(10) Patent No.: US 10,010,943 B2
(45) Date of Patent: Jul. 3, 2018

(54) APPARATUS AND METHOD FOR ATTENUATION OF VIBRATION IN MACHINE TOOL

(71) Applicant: KOREA INSTITUTE OF MACHINERY & MATERIALS, Daejeon (KR)

(72) Inventors: Dong-Hoon Kim, Daejeon (KR); Joon Yub Song, Daegeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 14/128,709

(22) PCT Filed: Sep. 11, 2013

(86) PCT No.: PCT/KR2013/008236
§ 371 (c)(1),
(2) Date: Dec. 23, 2013

(87) PCT Pub. No.: WO2014/054858
PCT Pub. Date: Apr. 10, 2014

(65) Prior Publication Data
US 2015/0217379 A1    Aug. 6, 2015

(30) Foreign Application Priority Data

Oct. 4, 2012  (KR) .................. 10-2012-0109784

(51) Int. Cl.
*G05B 21/00* (2006.01)
*B23B 29/12* (2006.01)
(Continued)

(52) U.S. Cl.
CPC .......... *B23B 29/125* (2013.01); *B23B 29/244* (2013.01); *B23Q 11/0032* (2013.01);
(Continued)

(58) Field of Classification Search
CPC .......... F16F 15/00; F16F 15/005; F16F 15/02; F16F 13/26; F16F 15/027; G05D 19/02;
(Continued)

(56) References Cited

U.S. PATENT DOCUMENTS 4,626,730 A * 12/1986 Hubbard, Jr. ......... B06B 1/0688
310/316.01
6,310,746 B1 * 10/2001 Hawwa .................. G11B 21/00
360/244.2
(Continued)

FOREIGN PATENT DOCUMENTS

JP      06-023606       2/1994
JP      2002-528281     9/2002
(Continued)

OTHER PUBLICATIONS

M. Feldman, "Non-Linear Free Vibration Identification Via The Hilbert Transform," Journal of Sound and Vibration (1997).*
(Continued)

*Primary Examiner* — Darrin Dunn
(74) *Attorney, Agent, or Firm* — Lex IP Meister, PLLC (57) ABSTRACT

The present invention relates to an apparatus and method for attenuation of vibration in a machine tool, and more particularly, to an apparatus and method for attenuation of vibration in a machine tool in which a vibration of a machine tool is measured, and generates an identical frequency with a piezoelectric actuator as well as changes a phase for making dissipative interference of a generated vibration wave form.

8 Claims, 11 Drawing Sheets

(51) Int. Cl.
*B23Q 11/00* (2006.01)
*B23B 29/24* (2006.01)
*G05B 15/02* (2006.01)
*G05B 19/404* (2006.01)

(52) U.S. Cl.
CPC ........... *G05B 15/02* (2013.01); *G05B 19/404* (2013.01); *B23B 2250/16* (2013.01); *B23B 2260/108* (2013.01); *G05B 2219/37434* (2013.01); *G05B 2219/49176* (2013.01); *Y10T 82/2585* (2015.01)

(58) Field of Classification Search
CPC ........ G05B 19/404; G05B 2219/37434; G05B 2219/39199; G05B 2219/41115; G05B 2219/41191; G05B 2219/41256; G05B 2219/49048
See application file for complete search history.

(56) References Cited

U.S. PATENT DOCUMENTS

| | | | |
|---|---|---|---|
| 6,661,157 B1 | 12/2003 | Lundblad | |
| 7,234,379 B2 | 6/2007 | Claesson | |
| 7,340,985 B2 | 3/2008 | Claesson et al. | |
| 8,430,610 B2 | 4/2013 | Komai | |
| 2002/0033083 A1* | 3/2002 | Claesson | B23B 27/002 82/118 |
| 2002/0036091 A1 | 3/2002 | Claesson | |
| 2003/0209114 A1 | 11/2003 | Forster | |
| 2004/0155558 A1* | 8/2004 | Cuttino | H01L 41/0906 310/317 |
| 2005/0270380 A1* | 12/2005 | Tomita | H04N 5/23248 348/208.99 |
| 2006/0291973 A1* | 12/2006 | Claesson | B23B 27/002 409/234 |
| 2008/0298912 A1 | 12/2008 | Schmitz | |
| 2009/0195922 A1* | 8/2009 | Urmanov | G11B 25/043 360/97.19 |
| 2011/0135415 A1* | 6/2011 | Hamaguchi | B23Q 11/0032 409/79 |
| 2012/0004777 A1* | 1/2012 | Wang | B66B 7/042 700/280 |
| 2012/0101624 A1* | 4/2012 | Ueno | B23Q 17/0976 700/173 |
| 2012/0226414 A1* | 9/2012 | Tomizaki | F16F 15/002 701/36 |
| 2013/0136269 A1* | 5/2013 | Sakamoto | G10K 11/178 381/71.4 |
| 2015/0039138 A1* | 2/2015 | Kao | F16F 15/00 700/280 |

FOREIGN PATENT DOCUMENTS

| | | |
|---|---|---|
| JP | 2002-528284 | 9/2002 |
| JP | 2005-305623 | 11/2005 |
| JP | 2012-093983 | 5/2012 |
| KR | 10-2008-00985 | 11/2008 |
| KR | 10-2008-0098583 | 11/2008 |
| WO | 2014/002905 | 1/2014 |

OTHER PUBLICATIONS

Boashash, Estimating and Interpreting the Instantaneous Frequency of a Signal—Part 1, Fundamentals, IEEE, 1992.*
Radecki et al., "Vibration Suppression in Cutting Tools Using Collocated Piezoelectric Sensors/Actuators With an Adaptive Control Algorithm," ASME, 7/06.*
Harms et al., "Tool Adaptor for Active Vibration Control in Turning Operations," Actuator 2004, 9th. Int. Conf. on New Actuators, 14-16, 2004.*
International Search Authority, International Written Opinion and Search report, PCT/ISA/237 & PCT/ISA/210 of PCT/KR2013/008236 (Dec. 23, 2013).

* cited by examiner

APPARATUS AND METHOD FOR ATTENUATION OF VIBRATION IN MACHINE TOOL

CROSS-REFERENCE TO RELATED APPLICATION

This application is a National Stage application of PCT/KR2013/008236 filed on Sep. 11, 2013, which claims priority to Korean Patent Application No. 10-2012-0109784, filed on Oct. 4, 2012.

BACKGROUND OF THE INVENTION (a) Field of the Invention

The present invention relates to an apparatus and method for attenuation of vibration in a machine tool, and more particularly, to an apparatus and method for attenuation of vibration in a machine tool in which a vibration of a machine tool is measured and an identical frequency is generated with a piezoelectric actuator, and changes a phase for making dissipative interference of the generated vibration wave form.

(b) Description of the Related Art

A machine tool is generally regarded as a machine for mechanical fabrication. The machine tool is a machine for processing metal and other materials by cutting off, cutting, boring, drilling, screw cutting, grinding, and so on with a cutting tool while producing cutting chips to form a required shape. The machine tool is not only a machine for fabricating a machine, but is also a machine which is a base of all machines. In general, in many cases, the machine tool is a machine for processing metal. Of machine tools, there are general purpose machine tools and simple purpose machine tools, and in the general purpose machine tool, there are a lathe, a drilling machine, a boring machine, a milling machine, a sawing machine, a grinding machine, and so on.

The machine tool inevitably undergoes vibration due to design errors and disturbances. The vibration is a major cause of reduction of not only durability of the machine and a structure, but also precision reduction of a processed article to cause very large losses.

In a related art, when a deep hole is formed in a large component, it is difficult to secure required surface roughness due to vibration at the time of processing when a depth of the hole is extensive compared to a diameter of the hole, i.e., an aspect ratio, is larger than 4D, so a method is widely used in which the component is processed as smaller modules and the modules are welded together. Recently, the greater the requirements for processing a large unitized component (e.g., an aircraft landing gear, a large sized motor, a wind power plant, and other heavy industrial components), the greater the requirements for processing a deep hole, typically in drilling and boring processes. Drilling is a process for initially machining a hole roughly, and the boring is a post-process for hardening or precisely enlarging an inside diameter of the hole.

Therefore, since the boring process requires precision in comparison to the drilling process, the boring process is a typical process which requires attenuation of the vibration at the time of processing the deep hole for achieving required surface roughness (in general, within 2 μm).

In general, in the related art, in order to attenuate the vibration generated at the time of boring, a dash pot is mounted to a tool holder for suppressing the vibration or a damper is mounted to a base of a boring machine for removing the vibration. Since levels and frequencies of vibrations, such as a vibration occurring at a structure/machine itself and a vibration applied thereto by disturbance, always vary, the above methods have a limitation not only on a wide frequency band design, but also in applicability due to very high replacement cost, and working cost for a change such as design modification. In the related art, in order to attenuate generated vibration which influences the surface roughness at the time of processing, passive methods are mostly used. As an example, although the vibration varies with machines or processing conditions, since there is a range of vibration generated according to a specific machine or generally settled processing conditions (e.g., a feed speed of a tool, a rotation speed, a cutting depth, and so on), in the related art, the passive methods are at a level at which stiffness design of the machine tool has been made to approximately meet a predicted vibration range, or a damper is provided to the machine tool to approximately meet a predicted vibration range. Since it is impossible to utilize the passive methods for a variety of processes and processing conditions, structural design changes result, which causes additional time and cost (e.g., a design change and replacement work cost), and accordingly the passive methods are not effective.

Korean Laid Open Patent No. 10-2008-0098583 discloses an apparatus for preventing a machine tool from shaking.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method for attenuation of vibration in a machine tool having an advantage of making dissipative interference of a vibration wave form.

Accordingly, devised for solving the above problems, an object of the present invention is to provide an apparatus and method for attenuation of vibration in a machine tool, in which a sensor unit is used for measuring a vibration frequency and amplitude in real time, and applying a frequency corresponding thereto to an exciter for actively attenuating the vibration generated at the machine tool.

To achieve the objects of the present invention, an apparatus for attenuation of vibration in a machine tool includes a tool holder 100 provided to the machine tool for holding a cutting tool 10, a sensor unit 200 fixedly secured to the tool holder 100 for sensing vibration of the cutting tool 10, an excitation unit 300 fixedly secured to the tool holder 100 for applying vibration to the cutting tool 10, and a control unit 400 connected to the sensor unit 200 and the excitation unit 300 for controlling the excitation unit 300 by using information sensed by the sensor unit 200.

The tool holder 100 includes a tool holder frame unit 110, a cutting tool holding unit 120 provided to one side of the tool holder frame unit 110 for holding the cutting tool 10, and a tool holder fastening unit 130 provided to one side of the tool holder frame unit 110 for fastening the tool holder 100.

The excitation unit 300 includes an exciter securing unit 310 fixedly and closely secured to the tool holder 100, and a piezoelectric actuator 320 in contact with the cutting tool 10 for applying vibration according to the vibration sensed by the sensor unit 200.

The excitation unit 300 further includes a preload adjusting unit 330 disposed between the tool holder 100 and the piezoelectric actuator 320 for adjusting a preload of the piezoelectric actuator 320.

The apparatus for attenuation of vibration in a machine tool further includes a cover unit 140 provided to an outside of the tool holder 100 in a mode to surround the tool holder 100.

The sensor unit 200 includes at least one acceleration sensor for making communication by at least one of methods selected from wire and wireless methods.

The control unit 400 includes a signal processing unit 410 connected to the sensor unit 200 for measuring a vibration frequency and a wave speed of the sensor unit 200 by using a signal obtained by the sensor unit 200 to predict a frequency of vibration to be applied by the excitation unit 300, and an excitation control unit 420 connected to the signal processing unit 410 and the excitation unit 300 for having the vibration predicted at the signal processing unit inputted thereto to control the excitation unit.

The signal processing unit 410 measures a main frequency and a phase change of the vibration signal inputted thereto from the sensor unit 200 to derive the wave speed, predicts actual vibration amplitude of a vibration source by measuring attenuation in a medium of the vibration signal, and determines amplitude to be applied to the excitation unit 300.

The excitation control unit 420 controls the excitation unit 300 with the vibration predicted at the signal processing unit 410, measures a vibration peak attenuated by the excitation unit 300 for having a result thereof fed back to monitor a change of the vibration, and controls the excitation unit 300 while changing a phase of the frequency to be applied for attenuating the generated vibration.

A method for attenuation of vibration in a machine tool in accordance with an exemplary embodiment of the present invention using an apparatus for attenuating vibration having a tool holder 100, a sensor unit 200, an excitation unit 300, and a control unit 400 is provided, including a signal input step (S10) for having a vibration signal inputted from the sensor unit 200, a vibration predicting step (S20) for predicting amplitude of the vibration inputted from the sensor unit 200 by using the signal inputted in the signal input step (S10), and an exciter control step (S30) for controlling the excitation unit 300 by using the amplitude of the vibration predicted in the vibration predicting step (S20).

The vibration predicting step (S20) includes a signal amplifying step (S21) for amplifying the signal inputted in the signal input step (S10) with an amplifier, a voltage signal obtaining step (S22) for obtaining the signal amplified in the signal amplifying step (S21) in a voltage V signal corresponding to a time domain T, a Fourier transform step (S23) for subjecting the voltage signal obtained in the voltage signal obtaining step (S22) to FFT (fast Fourier transformation) for transformation of the voltage signal into a vibration level (Amplitude of force), and a vibration amplitude obtaining step (S24) for obtaining vibration amplitude corresponding to a frequency domain by using transformed information in the Fourier transform step (S23).

The vibration amplitude obtaining step (S24) includes a frequency and wave speed predicting step (S25) for predicting a main frequency and a wave speed by using the signal obtained in the Fourier transformation step (S23), and an amplitude determining step (S26) for measuring attenuation of the vibration signal in a medium to predict actual an vibration amplitude of the vibration source to determine an amplitude to be applied.

The method further includes, after the excitation control step (S30), a feedback control step (S40) for controlling the excitation unit 300 to monitor and compensate for the attenuated vibration in the excitation unit control step (S30).

The feedback control step (S40) includes a vibration peak measuring step (S41) for measuring a vibration peak of the attenuated vibration by the excitation unit 300, a monitoring step (S42) for having the measured vibration peak fed back from the vibration peak measuring step (S41) to monitor a change of the vibration, and a compensative control step (S43) for controlling the excitation unit 300 while changing a phase of the frequency to be applied by using information monitored in the monitoring step (S42).

The apparatus and method for attenuation of vibration in a machine tool according to an exemplary embodiment of the present invention can improve precision of processing with a machine tool, and can increase a lifetime of the machine tool to accordingly provide an excellent cost saving effect, by measuring vibration in real time and attenuating the vibration based on a result of the measurement.

DETAILED DESCRIPTION OF THE EMBODIMENTS

Hereafter, an apparatus and method for attenuation of vibration in a machine tool in accordance with an exemplary embodiment of the present invention will be described with reference to accompanying drawings.

Figure 1:
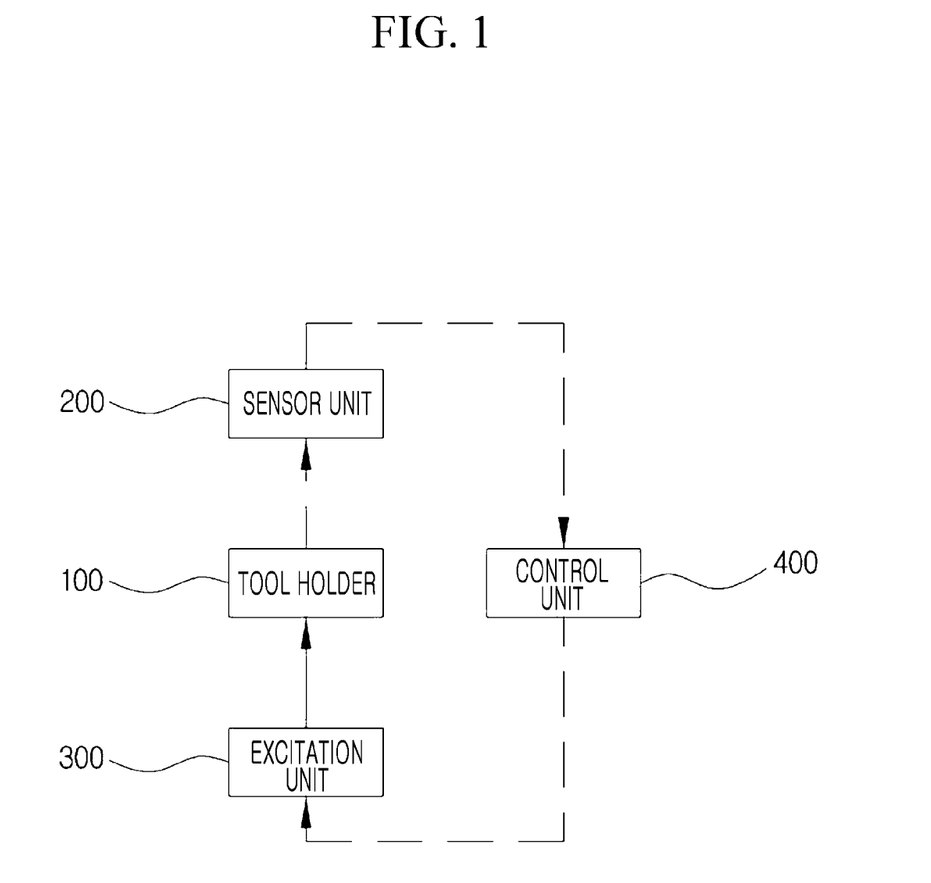
FIG. 1 illustrates a block diagram of an apparatus for attenuation of vibration in a machine tool in accordance with an exemplary embodiment of the present invention.
Figure 2:
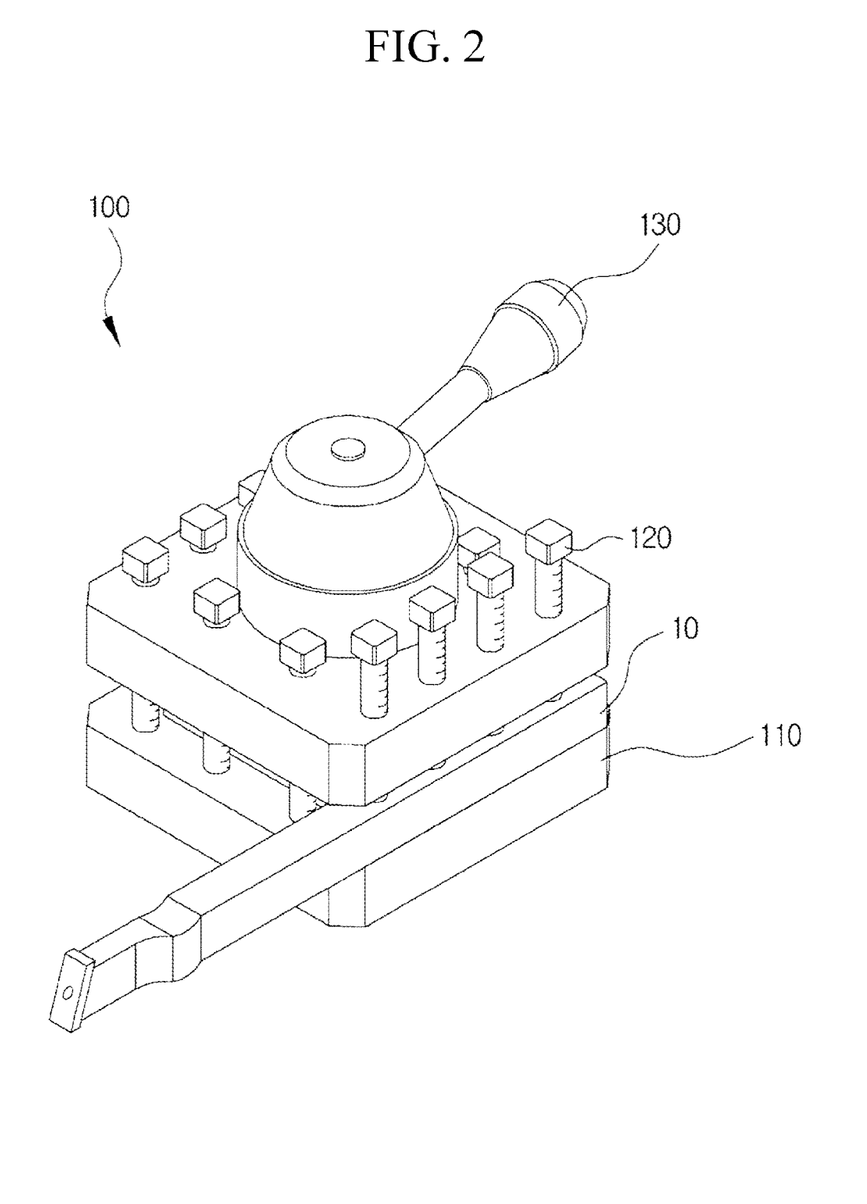
FIG. 2 illustrates a perspective view of an apparatus for attenuation of vibration in a machine tool in accordance with an exemplary embodiment of the present invention.
Figure 3:
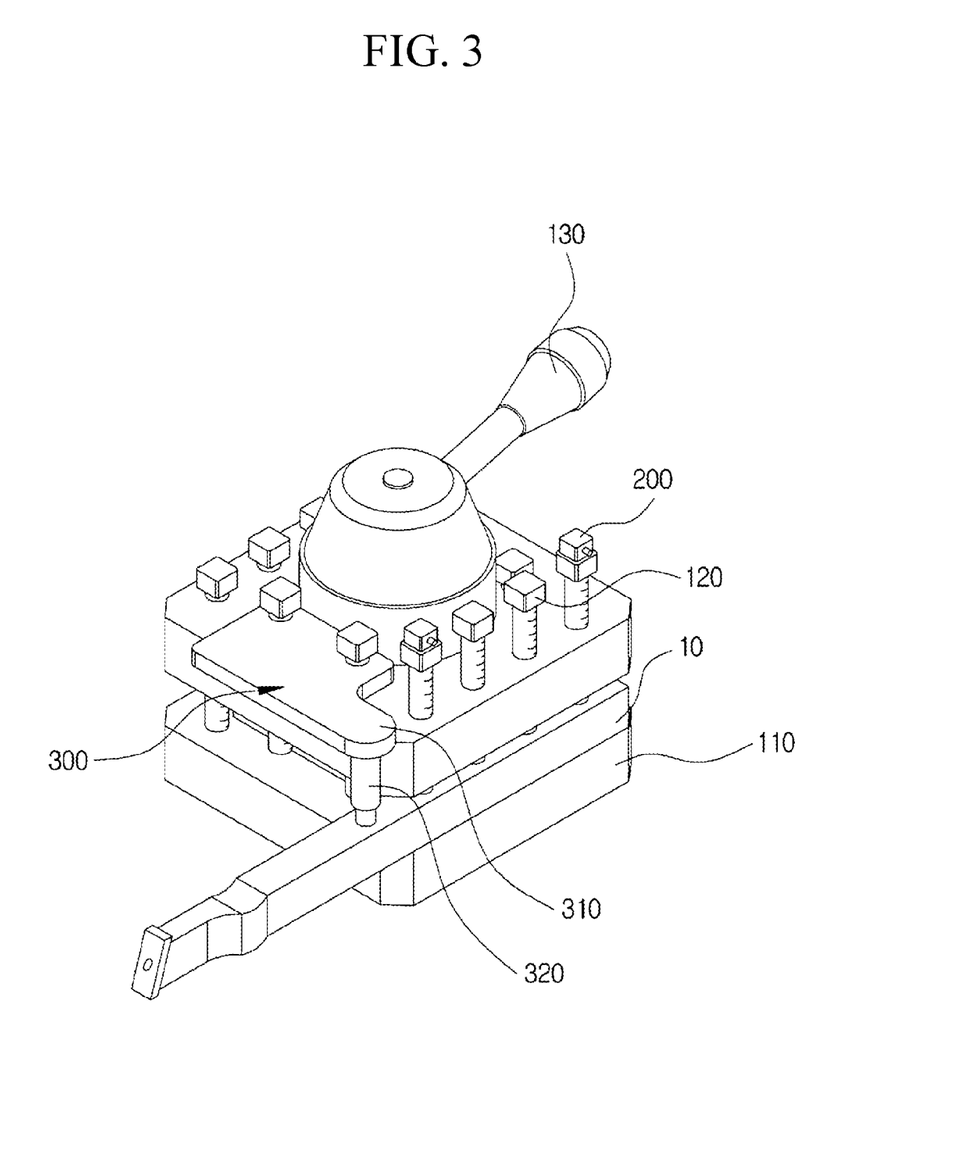
FIG. 3 illustrates a perspective view of a tool holder in an apparatus for attenuation of vibration in a machine tool in accordance with an exemplary embodiment of the present invention.
Figure 4:
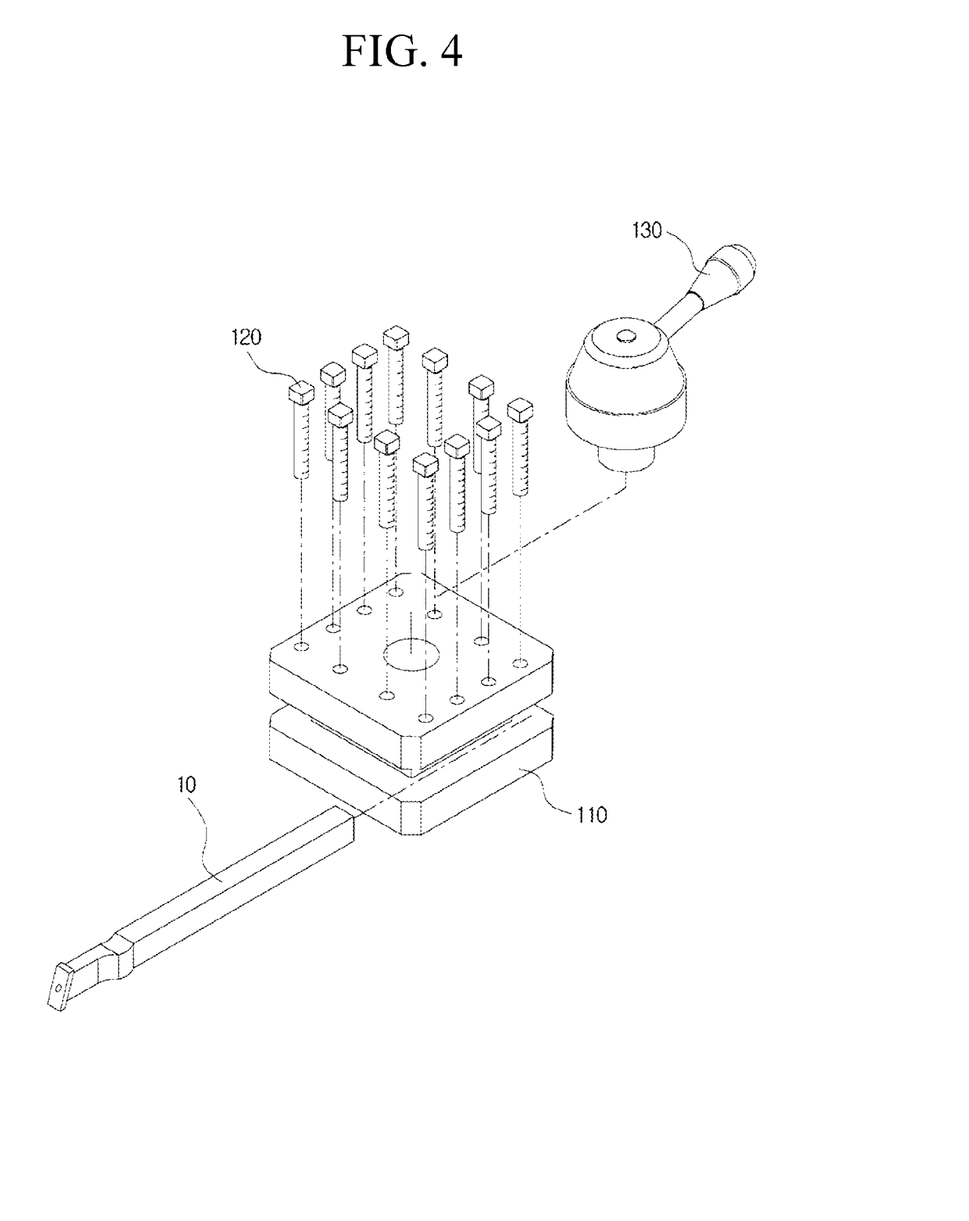
FIG. 4 illustrates an exploded perspective view of a tool holder in an apparatus for attenuation of vibration in a machine tool in accordance with an exemplary embodiment of the present invention.
Figure 5:
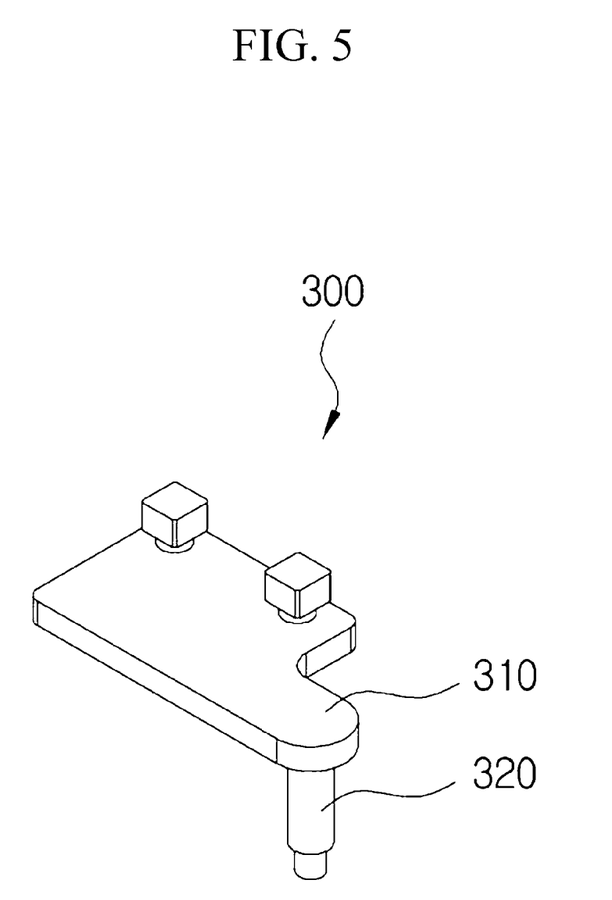
FIG. 5 illustrates a perspective view of an excitation unit in an apparatus for attenuation of vibration in a machine tool in accordance with an exemplary embodiment of the present invention.
Figure 6:
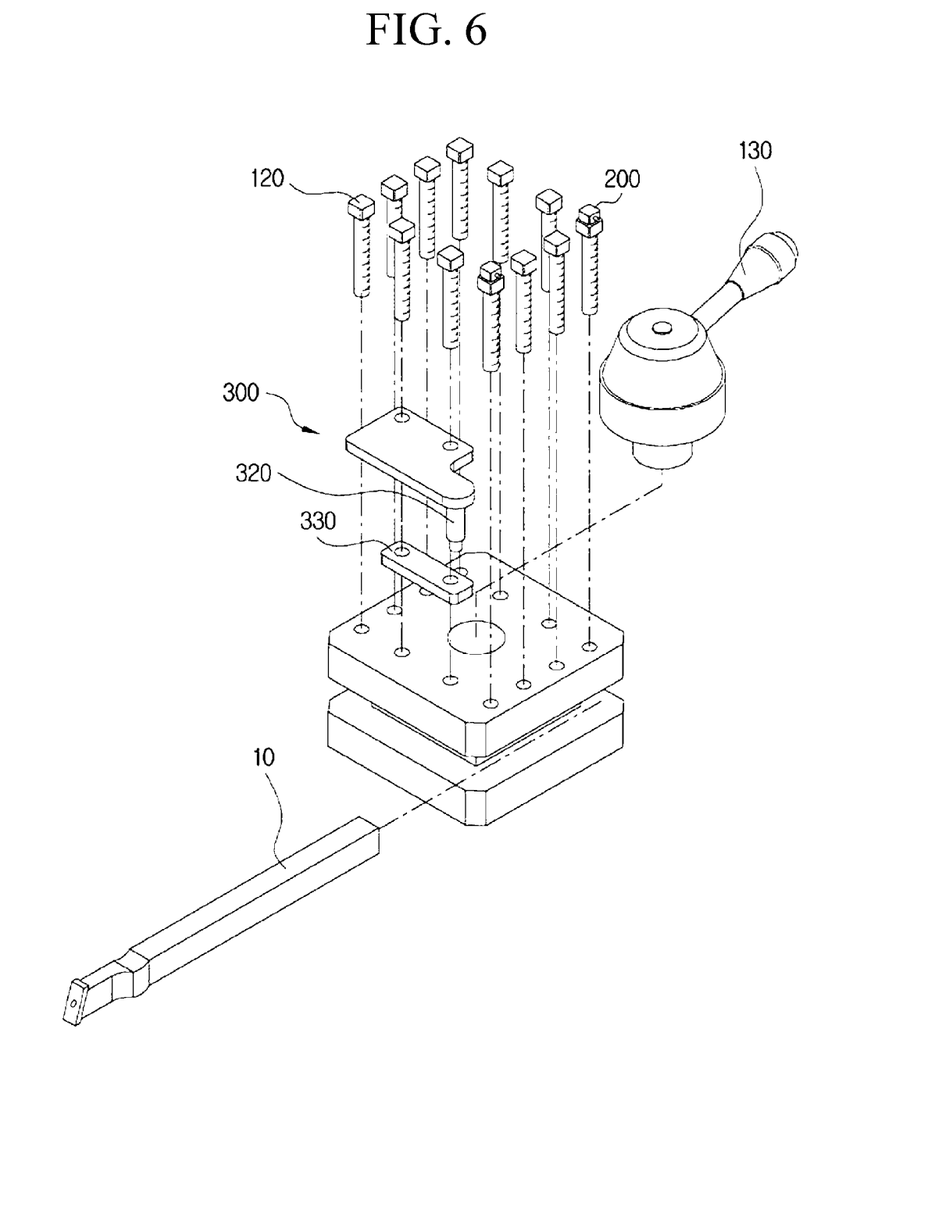
FIG. 6 illustrates an exploded perspective view of an apparatus for attenuation of vibration in a machine tool in accordance with an exemplary embodiment of the present invention, including a preload adjusting unit.
Figure 7:
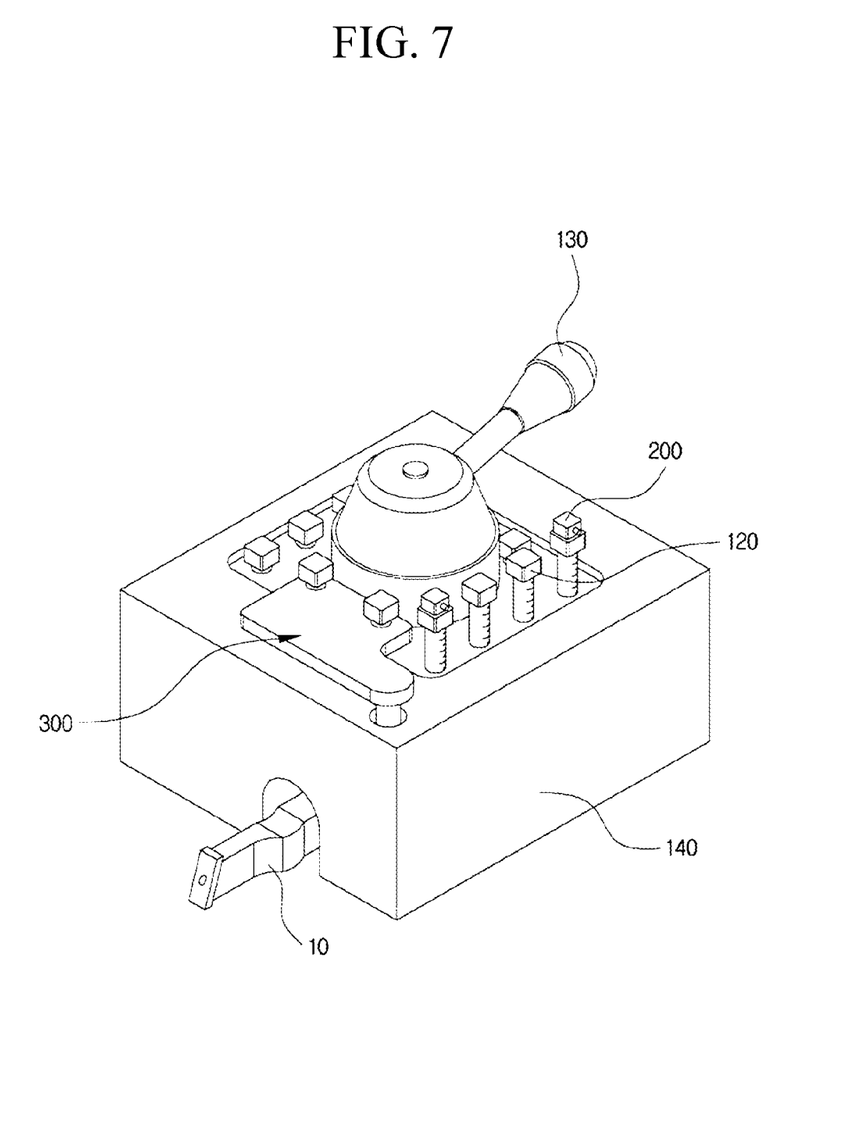
FIG. 7 illustrates a perspective view of an apparatus for attenuation of vibration in a machine tool in accordance with an exemplary embodiment of the present invention, including a cover unit.

FIG. 1 illustrates a block diagram of an apparatus for attenuation of vibration in a machine tool in accordance with an exemplary embodiment of the present invention, FIG. 2 illustrates a perspective view of an apparatus for attenuation of vibration in a machine tool in accordance with an exemplary embodiment of the present invention, FIG. 3 illustrates a perspective view of a tool holder in an apparatus for attenuation of vibration in a machine tool in accordance with an exemplary embodiment of the present invention, FIG. 4 illustrates an exploded perspective view of a tool holder in an apparatus for attenuation of vibration in a machine tool in accordance with an exemplary embodiment of the present invention, FIG. 5 illustrates a perspective view of an excitation unit in an apparatus for attenuation of vibration in a machine tool in accordance with an exemplary embodiment of the present invention, FIG. 6 illustrates an exploded perspective view of an apparatus for attenuation of vibration in a machine tool in accordance with an exemplary embodiment of the present invention including a preload adjusting unit, FIG. 7 illustrates a perspective view of an apparatus for attenuation of vibration in a machine tool in accordance with an exemplary embodiment of the present invention including a cover unit, and FIGS. 8 to 11 illustrate flowcharts each showing the steps of a method for attenuation of vibration in a machine tool in accordance with an exemplary embodiment of the present invention.

Referring to FIGS. 1 and 2, the apparatus for attenuation of vibration in a machine tool in accordance with the present invention includes a tool holder 100, a sensor unit 200, an excitation unit 300, and a control unit 400.

The tool holder 100 is provided to a machine tool for holding a cutting tool 10.

The sensor unit 200 is fixedly secured to the tool holder 100 for sensing vibration of the cutting tool 10. In this case, the sensor unit 200 includes at least one acceleration sensor for measuring a frequency and a wave speed of the vibration generated at the time of cutting, and communicates by at least one of methods selected from wire and wireless methods. As an example, two sensors may be provided such that one sensor is able to communicate by wire as a main sensor, and the other is able to communicate without wire as an auxiliary sensor so as to be ready to operate in case there is a problem with a signal from the main sensor (e.g., an unstable power source noise, etc.).

The excitation unit 300 is fixedly secured to the tool holder 100 for applying vibration to the cutting tool 10.

The control unit 400 is connected to the sensor unit 200 and the excitation unit 300 for controlling the excitation unit 300 by using information sensed at the sensor unit 200. That is, in order to attenuate the vibration generated at the tool holder 100, the excitation unit 300 is connected to the tool holder 100 so that the control unit 400 predicts amplitude of the vibration of a vibration generation source by using the sensor unit attached to the tool holder 100, and applies a frequency which can remove the vibration generated thus to the excitation unit 300 at the predicted amplitude, thereby attenuating the vibration generated externally.

The tool holder 100 will be described in more detail. Referring to FIGS. 3 and 4, the tool holder 100 includes a tool holder frame unit 110, a cutting tool holding unit 120, and a tool holder fastening unit 130.

The tool holder frame unit 110 forms a base for holding the cutting tool 10, and may have a shape similar to, as an example, a frame of a tool post of a lathe.

The cutting tool holding unit 120 is provided to one side of the tool holder frame unit 110 for holding the cutting tool 10. As an example, if the tool holder 100 has a similar shape to the tool post of the lathe, the cutting tool holding unit 120 may be a clamping bolt for clamping down the cutting tool.

The tool holder fastening unit 130 is provided to one side of the tool holder frame unit 110 for fastening the tool holder 100. As an example, if the tool holder 100 has a similar shape to the tool post of the lathe, if the tool holder fastening unit 130 is unfastened, the tool holder is rotatable by 360 degrees, and if the tool holder fastening unit 130 is fastened, the tool holder can be fastened.

The excitation unit 300 will be described in more detail. Referring to FIG. 5, the excitation unit 300 includes an exciter securing unit 310 and a piezoelectric actuator 320.

The exciter securing unit 310 is closely and fixedly secured to the tool holder 100. As an example, if the tool holder 100 has a similar shape to the tool post of the lathe, the exciter securing unit 310 is closely and fixedly secured to the tool holder 100 to prevent the exciter securing unit 310 from shaking by the vibration for enhancing a transmission rate of the vibration applied to the excitation unit 300 to the cutting tool 10.

The piezoelectric actuator 320 is in contact with the cutting tool 10 for applying vibration thereto according to the vibration sensed at the sensor unit 200.

The piezoelectric actuator is an actuator having deformation of a material by a piezoelectric effect or an electrostrictive effect applied thereto, and is mostly formed of a piezoelectric material. A relation between an electric field E and deformation e of the piezoelectric material is expressed as e=dE, where d is a piezoelectric constant. The above relation is effective if an area E is comparatively small, and if E is large, greater deformation than this occurs due to spontaneous polarization. As the piezoelectric material of the actuator, a material having a large electric field induced deformation is favorable, and a perovskite crystal solid solution is appropriate for such a purpose.

Methods for fabricating the actuator include a method for enlarging or reducing the deformation by an electric field applied to the piezoelectric material, and a method of using opposite phenomena caused by a voltage applied to different piezoelectric bodies bonded oppositely. Applications of this include a piezoelectric loudspeaker, a piezoelectric oscillator, a piezoelectric motor, a super-precision mobile stage, a piezoelectric transducer, an electrical source for an igniter, and so on.

Referring to FIG. 6, the excitation unit 300 may further include a preload adjusting unit 330 placed between the tool holder 100 and the piezoelectric actuator 320 for adjusting a preload on the piezoelectric excitation unit 300. In this case, the preload that is adjustable by adjusting the tool holder fastening unit 130 is in a range of 0-10 mm.

Referring to FIG. 7, the apparatus and method for attenuation of vibration in a machine tool in accordance with an exemplary embodiment of the present invention may further include a cover unit 140 provided outside of the tool holder 100 to surround the tool holder 100 for protecting the excitation unit 300 from cutting chips or cutting oil produced while cutting. When cutting with the machine tool, the cutting chips are produced, and the cutting oil is used in order to make the cutting easier. In this case, since inflow of the used cutting oil and the cutting chips to the excitation unit 300 is liable to deteriorate performance of the excitation unit 300, the cover unit 140 is further included as a protective means for protecting the excitation unit 300.

The control unit 400 will now be described in more detail. The control unit 400 includes a signal processing unit 410 and an excitation control unit 420.

The signal processing unit 410 is connected to the sensor unit 200 for measuring a vibration frequency and a wave speed of the sensor unit 200 by using a signal obtained by the sensor unit 200 to predict a vibration frequency to be applied to the excitation unit 300. In this case, the signal processing unit 410 measures a main frequency and a phase change of a vibration signal input thereto from the sensor unit 200, to derive the wave speed, measures attenuation of the vibration signal in a medium to predict an actual vibration amplitude of a vibration source, and determines vibration amplitude to be applied to the excitation unit 300.

The excitation control unit 420 is connected to the signal processing unit 410 and the excitation unit 300 for receiving the predicted vibration from the signal processing unit to control the excitation unit. In this case, the excitation control unit 420 controls the excitation unit 300 with the vibration predicted at the signal processing unit 410, measures a vibration peak attenuated by the excitation unit 300, has a result of the measurement fed back thereto to monitor a change of the vibration, and controls the excitation unit 300 while varying a phase of the vibration frequency to be applied for attenuating the vibration generated thusly. In this case, for measuring the vibration peak attenuated by the excitation control unit 420, a band-pass filter may be used. In this case, the band-pass filter is a filter which passes a frequency band of a limited range centered on a frequency, and may also be called a band filter. As an example, in actual boring with a boring machine, a primary natural frequency of a boring bar can be determined with a measuring instrument, such as an oscilloscope (or may be predicted with a disturbance vibration tester or an ANSYS analysis). In general, a noise band is formed at the time of actual processing due to a machine clearance, unstable power source noise, and eccentric force of a rotating body, and, in order to remove such an unnecessary data band (Noise), since a band is set at the band-pass filter to leave only a required band, filtering can be done to secure only necessary data.

Figure 8:
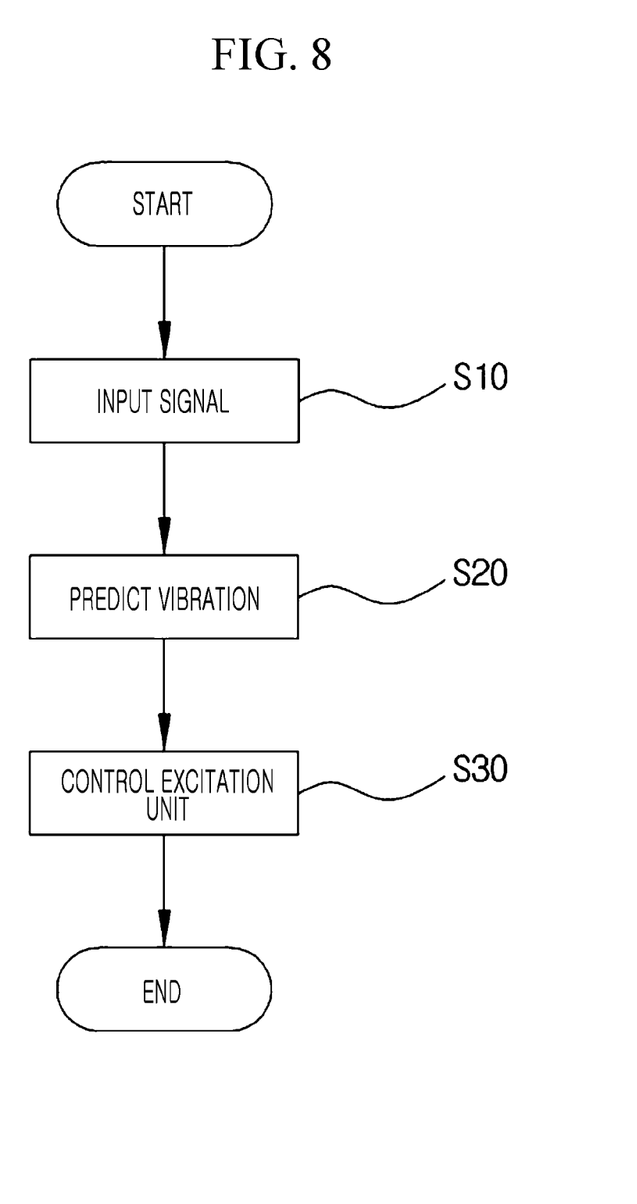
FIGS. 8 to 11 illustrate flowcharts each showing the steps of a method for attenuation of vibration in a machine tool in accordance with an exemplary embodiment of the present invention.

Referring to FIG. 8, a method for attenuation of vibration in a machine tool, using an apparatus for attenuation of vibration in a machine tool having a tool holder 100, a sensor unit 200, an excitation unit 300, and a control unit 400 in accordance with an exemplary embodiment of the present invention includes a signal input step (S10), a vibration predicting step (S20), and an excitation unit control step (S30).

The signal input step (S10) includes the step of having a vibration signal inputted from the sensor unit 200.

The vibration predicting step (S20) includes the step of predicting vibration amplitude of the vibration inputted from the sensor unit 200 by using the signal thusly inputted in the signal input step (S10).

The excitation unit control step (S30) includes the step of controlling the excitation unit 300 by using the vibration amplitude predicted in the vibration predicting step (S20).

That is, by predicting the vibration amplitude of a vibration generation source upon having the vibration signal inputted thereto from the sensor unit 200, and applying a frequency to the excitation unit 300 for removing the vibration from the vibration generation source by using the predicted vibration amplitude, the control unit 400 can attenuate the vibration generated at the tool holder 100 of a machine tool.

Figure 9:
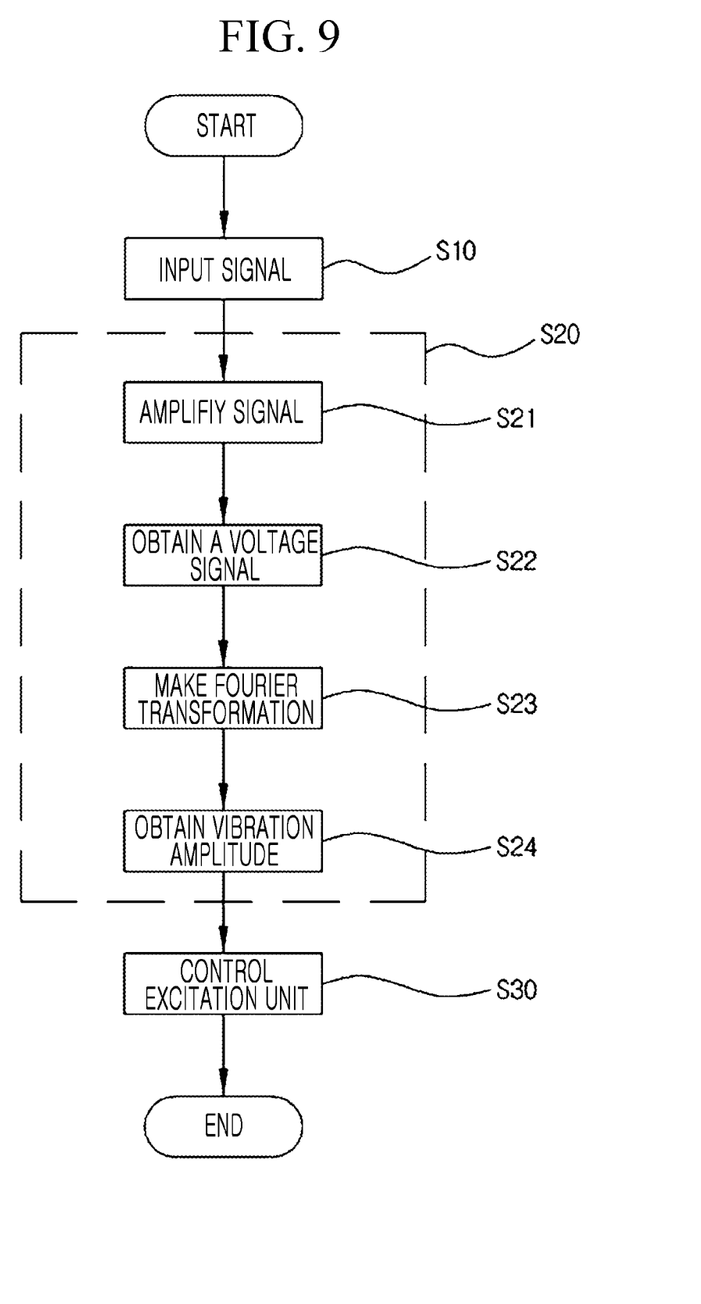

The vibration predicting step (S20) will be described in more detail. Referring to FIG. 9, the vibration predicting step (S20) includes a signal amplifying step (S21), a voltage signal obtaining step (S22), a Fourier transform step (S23), and a vibration amplitude obtaining step (S24).

In the signal amplifying step (S21), the signal inputted in the signal input step (S10) is amplified with an amplifier.

In the voltage signal obtaining step (S22), the signal amplified in the signal amplifying step (S21) is obtained in a voltage V signal corresponding to a time domain T.

In the Fourier transform step (S23), the voltage signal obtained in the voltage signal obtaining step (S22) is subjected to FFT (fast Fourier transformation) for transformation of the voltage signal to a vibration level (amplitude of force).

In the vibration amplitude obtaining step (S24), vibration amplitude corresponding to a frequency domain is obtained by using information transformed thus in the Fourier transform step (S23).

That is, the control unit 400 amplifies the vibration signal inputted from the sensor unit 200 with the amplifier, obtains a voltage V signal corresponding to a time domain T, and subjects the voltage signal thusly obtained to FFT to transform the voltage signal to a vibration level to obtain vibration amplitude corresponding to a frequency domain.

Figure 10:
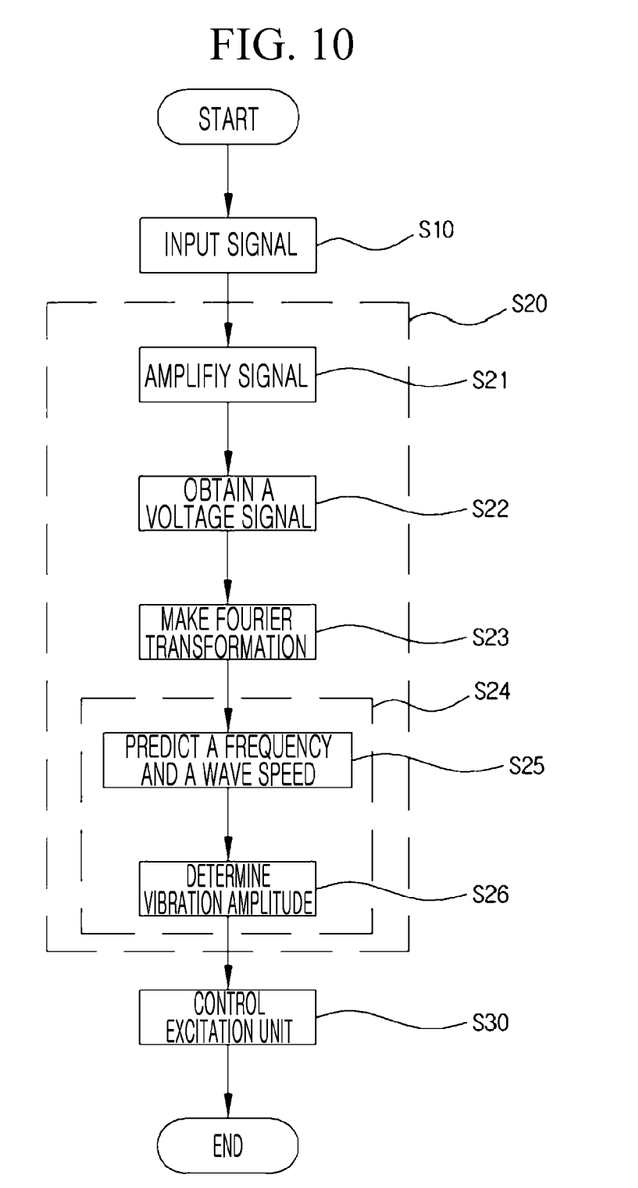

Referring to FIG. 10, the vibration amplitude obtaining step (S24) includes a frequency and a wave speed predicting step (S25) for predicting a main frequency and a wave speed by using the signal obtained in the Fourier transformation step (S23), and an amplitude determining step (S26) for measuring attenuation of the vibration signal in a medium to predict actual vibration amplitude of the vibration source to determine amplitude to be applied.

Figure 11:
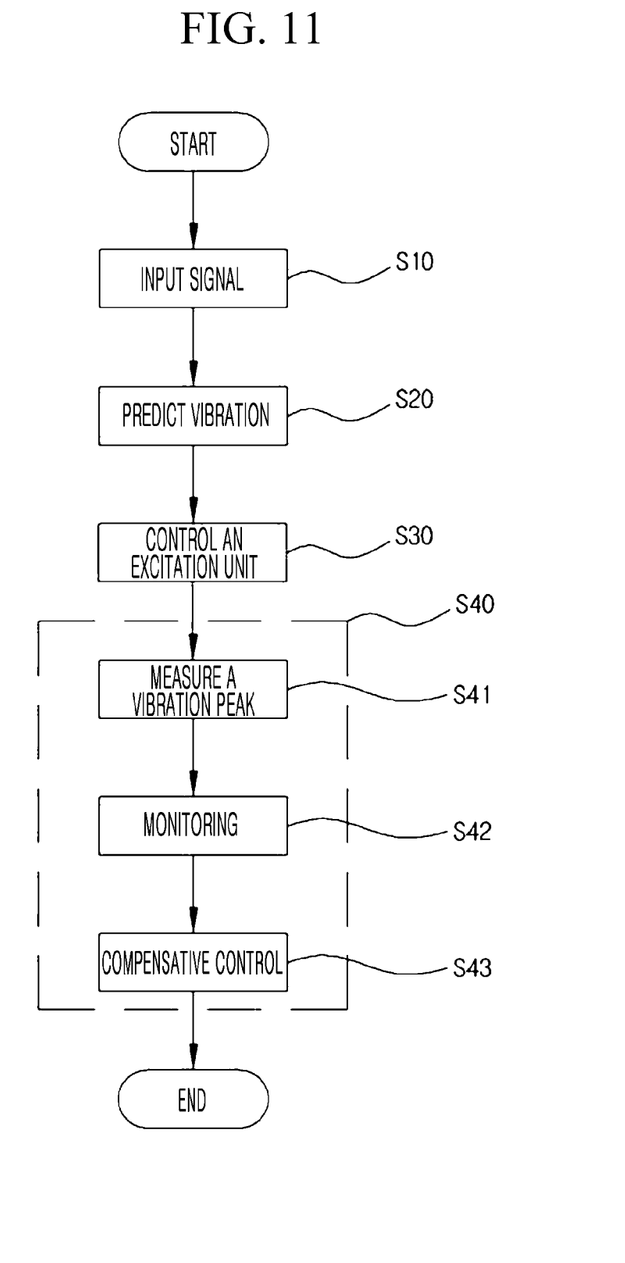

Referring to FIG. 11, a method for attenuation of vibration in a machine tool in accordance with an exemplary embodiment of the present invention further includes a feedback control step (S40) for controlling the excitation unit 300 to monitor and compensate for the attenuated vibration in the excitation unit control step (S30) after the excitation unit control step (S30). In this case, the feedback control step (S40) includes a vibration peak measuring step (S41) for measuring a vibration peak of the attenuated vibration by the excitation unit 300, a monitoring step (S42) for having the vibration peak thusly measured fed back from the vibration peak measuring step (S41) to monitor a change of the vibration, and a compensative control step (S43) for controlling the excitation unit 300 while changing a phase of the frequency to be applied by using information monitored in the monitoring step (S42).

The present invention is not limited to the exemplary embodiments, but it is apparent that, not only do a range of applications of the present invention vary, but also a variety of embodiments are possible without departing from the spirit or scope of the present invention claimed in the claims.

[Description of Symbols]

| | |
|---|---|
| 100: tool holder | 110: tool holder frame unit |
| 120: cutting tool holding unit | 130: tool holder fastening unit |
| 140: cover unit | 200: sensor unit |
| 300: excitation unit | 310: exciter securing unit |
| 320: piezoelectric actuator | 330: preload adjusting unit |
| 400: control unit | 410: signal processing unit |
| 420: excitation control unit | |
| S10: signal input step | S20: vibration predicting step |
| S21: signal amplifying step | S22: voltages signal obtaining step |
| S23: Fourier transform step | S24: vibration amplitude obtaining step |
| S25: frequency and wave speed predicting step | |
| S26: amplitude determining step | |
| S30: excitation unit control step | S40: feedback control step |
| S41: vibration peak measuring step | S42: monitoring step |
| S43: compensative control step | |

What is claimed is:

1. An apparatus for attenuation of vibration in a machine tool, comprising:
    a tool holder 100 provided to the machine tool and holding a cutting tool 10;

a sensor 200 sensing vibration of the cutting tool 10;

an exciter 300 fixedly secured to the tool holder 100 and applying vibration to the cutting tool 10; and a controller 400 connected to the sensor 200 and the exciter 300 and controlling the exciter 300 by using information sensed at the sensor 200, wherein the exciter 300 comprises:

a securing member 310 fixedly and closely secured to the tool holder 100; and a piezoelectric actuator 320 in contact with the cutting tool 10 and provided to one side of the securing member 310 and applying vibration according to the vibration sensed at the sensor 200, and wherein the tool holder 100 includes:

a tool holder frame 110; and a cutting tool holder 120 provided to one side of the tool holder frame 110 and holding the cutting tool 10, and wherein the sensor 200 is fixedly secured to the cutting tool holder 120.

2. The apparatus of claim 1, wherein the tool holder 100 further includes:

a fastener 130 provided to one side of the tool holder frame 110 and fastening the tool holder 100.

3. The apparatus of claim 1, wherein the exciter 300 further includes a preload adjuster 330 disposed between the securing member 310 and the frame member 110 and adjusting a preload of the piezoelectric actuator 320.

4. The apparatus of claim 1, further comprising a cover 140 provided to an outside of the tool holder 100 in a mode to surround the tool holder 100.

5. The apparatus of claim 1, wherein the sensor 200 includes at least one acceleration sensor for making communication by at least one of methods selected from wire and wireless methods.

6. The apparatus of claim 1, wherein the controller 400 includes:

a signal processor 410 connected to the sensor 200 for measuring a vibration frequency and a wave speed of the sensor 200 by using a signal obtained by the sensor 200 to predict a frequency of vibration to be applied by the exciter 300; and an excitation controller 420 connected to the signal processor 410 and the exciter 300 for receiving the vibration predicted at the signal processing unit to control the exciter 300.

7. The apparatus of claim 6, wherein the signal processor 410 measures a main frequency and a phase change of the vibration signal inputted thereto from the sensor 200 to derive the wave speed, measures attenuation in a medium of the vibration signal to predict actual vibration amplitude of a vibration source, and determines vibration amplitude to be applied to the exciter 300.

8. The apparatus of claim 6, wherein the excitation controller 420 controls the exciter 300 with the vibration predicted at the signal processor 410, measures a vibration peak attenuated by the exciter 300, has a result thereof fed back thereto to monitor a change of the vibration, and controls the exciter 300 while varying a phase of the frequency to be applied for attenuating the generated vibration.

* * * * *